United States Patent [19]

Naae et al.

[11] Patent Number: 5,230,814
[45] Date of Patent: Jul. 27, 1993

[54] HYDROCARBON RECOVERY COMPRISING INJECTING A SLUG COMPRISING OIL SOLUBLE ALKOXYLATED SURFACTANTS FROM LIGNIN

[75] Inventors: Douglas G. Naae; Michael G. DaGue; Nancy G. Dunn, all of Houston, Tex.

[73] Assignee: Texaco Inc., White Plains, N.Y.

[21] Appl. No.: 464,480

[22] Filed: Jan. 12, 1990

[51] Int. Cl.$^5$ .............................................. E21B 43/22
[52] U.S. Cl. ................................. 252/8.551; 166/274; 530/502
[58] Field of Search ..................... 252/8.554; 530/502; 166/274

[56] References Cited

U.S. PATENT DOCUMENTS

| | | | |
|---|---|---|---|
| 2,854,444 | 9/1958 | Monson et al. | 530/502 |
| 3,149,085 | 9/1964 | Ball et al. | 530/502 X |
| 3,763,139 | 10/1973 | Falkehag | 530/502 X |
| 4,731,491 | 3/1988 | Urban et al. | 530/502 X |
| 4,739,040 | 4/1988 | Naae et al. | 530/502 X |
| 4,781,251 | 11/1988 | Naae et al. | 530/502 X |

OTHER PUBLICATIONS

Morrison & Boyd, *Organic Chemistry*, Boston, Allyn and Bacon Inc., 1973, p. 567.

*Primary Examiner*—Gary L. Geist
*Attorney, Agent, or Firm*—Jack H. Park; James L. Bailey; Harold J. Delhommer

[57] ABSTRACT

A method of producing oil soluble surfactants from lignin is disclosed, along with a method for recovering oil from underground formations by means of a surfactant flooding system containing these lignin surfactants. Lignin is reduced in the presence of a carbon monoxide or hydrogen reducing agent at high temperature and pressure, alkoxylated with an $\alpha$-olefin epoxide and then changed into oil soluble lignin surfactants by a reaction selected from the group consisting of sulfonation, sulfation and alkoxysulfation.

3 Claims, No Drawings

HYDROCARBON RECOVERY COMPRISING INJECTING A SLUG COMPRISING OIL SOLUBLE ALKOXYLATED SURFACTANTS FROM LIGNIN

BACKGROUND OF THE INVENTION

This invention relates to a method of producing oil soluble surfactants from lignin and to a method of recovering oil from subterranean formations with surfactant flooding systems that incorporate lignin surfactants.

Surface active compounds or surfactants have become extremely important chemicals in our society. Numberless types of surfactants are used for a myriad of applications. To work effectively, surfactants require water soluble and oil soluble characteristics. It is these mixed characteristics which enable surfactants to lower the interfacial tension between two disparate liquids.

One problem with many surfactants is their high cost of manufacture. Surfactants which are relatively cheap have an inherent advantage in the market place.

A minor use of surfactants has been in surfactant flooding systems for enhanced oil recovery. Because of the relatively high cost of surfactants, surfactant flooding systems for oil recovery have generally not been economical. The economics of surfactant flooding have become more unfavorable with the recent low price of oil.

Surfactant flooding to recover oil has been actively investigated due to the relatively poor ability of water floods to displace remaining oil from a reservoir's pore structure. Because of the structure of the reservoir and relative interfacial tensions involved, the flood water may form channels or fingers, bypassing the oil in the formation. Even where water has flowed, residual oil is trapped in pores by viscous and capillary forces. Further flooding with water will not remove such oil.

Investigations of ways to increase oil recovery by improving the displacement ability of water floods have produced useful surfactants which reduce the interfacial tension between oil and water in the reservoir. With lower interfacial tensions, oil that is trapped in the pore structure can be dispersed into the water as smaller and more easily deformable droplets. Many types of surfactants have been investigated and the choice of which surfactant to employ in a water flood operation is dependent upon reservoir characteristics as well as the cost and availability of the surfactants.

Most surfactant floods have employed a petroleum sulfonate as a sole surfactant, or at least a major component of a mixture of surfactants. Synthetic alkyl benzene sulfonates and alkyl sulfonates and sulfates have also been proposed as oil recovery surfactants. To combat separation problems in surfactant mixtures, especially at high salinities (>2% salt), a material with both water soluble and oil soluble characteristics is usually added to sulfonate surfactant mixtures. These materials are generally referred to as "solubilizers" and are usually sulfate or sulfonate salts of polyethoxylated alcohols or alkylphenols. The choice and concentration of solubilizers employed is dependent upon the choice of surfactant used, their overall concentration, and salinity.

The reduction of lignins to produce certain simpler compounds is known in the art. The transformation of lignins to commodity chemicals such as benzene, phenol or cresol by hydrogenation has been extensively researched.

Carbon monoxide reduction is a little known area. Some work has been done on the reduction of coal by carbon monoxide, but little investigation has been made into the reduction of lignins by carbon monoxide.

The extensive research into the hydrogenation of lignins generally fits into two categories. Studies have been concerned with either the hydrogenation of wood as a pulping method or with the hydrogenation of lignin as a method to produce commodity chemicals. In the 1960s, Crown Zellerbach extensively studied the Noguchi process for converting desulfonated lignins to monophenols by catalytic hydrogenation. This is discussed in Goheen, D. W., "Hydrogenation of Lignin by Noguchi Process," *Lignin Structure and Reactions*, R. F. Gould, ed., ASC (1966).

More recently, Hydrocarbon Research, Inc. developed the Lignol process for converting kraft lignin to benzene and phenol as discussed in U.S. Pat. No. 4,420,644, and Huibers, D. T. A. and Jones, M. W., Can. J. Chem. Eng., Vol. 58, p. 718–722 (1980). This process achieved 20% to 35% yields of distillable monophenols. The Lignol process was designed to produce saleable commodity chemicals by adding separation and purification steps to the hydrogenation process.

Continental Can Company has published results of their research on aqueous hydrogenation of kraft lignin involving catalysts such as Raney Nickel and Raney Copper. Please see, Benigni, J. D., and Goldstein, I. S., J. Polymer Science. Part C, p. 467–75, 477–78 (1971).

The Noguchi, HRI, Lignol, and Continental Can processes used non-sulfonated lignin to keep from poisoning the hydrogenation catalyst with sulfur. This restriction placed a further limitation on the hydrogenation reaction as non-sulfonated lignins are less readily available than lignin sulfonates. Therefore, research was directed to hydrogenating lignin sulfonates with sulfur resistant catalysts. Generally, these processes have used an iron catalyst in a pasting oil that consists of the high boiling residue from the previous hydrogenation to yield a 30% to 60% conversion of lignin sulfonate to distillable products. They are described in U.S. Pat. No. 3,253,044 and Canadian Patent No. 559,006.

The hydrogenation of wood has also been studied to determine the types of compounds produced. Please see, Boocock, D. G. B., Mackay, D., McPherson, M., Nadeau, S., and Thurier, R., Can. J. Chem. Eng., Vol. 57, p. 98–101 (1979); Boocock, D. G. B. and Mackay, D., Energy Biomass Wastes, Vol. 4, p. 765–77 (1980); Boocock, D. G. B., Kallury, R. K. M. R., and Tidwell, T. T., Anal. Chem., Vol. 55, p. 1689–94 (1983); Bhaskaran, T. A. and Schuerch, C., Tappi, Vol. 52, p. 1948–52 (1969); and Burton, A., Dezutter, D., Grange, P., Poncelet, G., and Delmon, B., Comm. Eur. Commun., p. 935–9 (1983).

Two references have been found in the coal literature which imply that carbon monoxide and water may be better reducing agents for lignins than hydrogen. Please see, El-Saied, H. and Oelert, H. H., "Liquefaction of the Lignohemicellulosic Waste from Sulphite Spent Liquor," Cellulose Chem. Technol., Vol. 14, p. 507–516 (1980); and Baltisberger, R. J., Stenberg, V. I., Klabunde, K. J., and Woolsey, N. F., "Chemistry of Lignite Liquefaction," Final Progress Report January 1980 - December 1982, DOE/FC/02101-23, July 1983, p. 68–71 and 97–110. The DOE report also discloses that sulfur-containing materials could act as catalysts in carbon monoxide reductions of coal. Finally, a reference entitled "Dissimilar Behavior of Carbon Monoxide Plus Water and of Hydrogen in Hydrogenation," by Herbert Appell, Irving Wender and Ronald Miller of the Pittsburgh Coal Research Center of the U. S. Bureau of Mines published in American Chemical Society, Div. Fuel Chem., Prepr., Vol. 13(4), p. 39-44, reports one laboratory run where a small quantity of lignin was reduced by carbon monoxide to yield a benzene soluble material.

U.S. Pat. No. 4,739,040 discloses and claims a method of making surfactants from lignin wherein the lignin is reduced in the presence of carbon monoxide or hydrogen at elevated temperature and pressure and then converted into a water soluble lignin surfactant by one or a combination of several reactions such as alkoxylation, alkylation, sulfonation, sulfation, alkoxysulfation and sulfomethylation. U.S. Pat. No. 4,787,454 discloses a method of recovering hydrocarbons employing lignin surfactants disclosed in No. 4,739,040.

U.S. Pat. Nos. 4,739,041 and 4,790,382 disclose the preparation of alkylated, oxidized lignins as surfactants and a method of recovery hydrocarbons employing such lignin surfactants, respectively.

The Williamson ether synthesis of lignin to yield a lignin surfactant is disclosed in U.S. Pat. No. 3,865,803. The disclosure teaches a reaction between lignin and an organic halide to make an ether. The organic halide has the structure $X(CH_2)_nY$, wherein X is a halogen, epoxide ring, activated double bond or halohydrin, and Y is a functional group such as sulfonate, phosphonate, hydroxyl, sulfide, or secondary or tertiary amine, and n is an integer from 1 to 5. The presence of Y gives an added functionality at the opposite end of the organic halide from the X substituent.

U.S. Pat. No. 2,531,502 discloses the reaction with liquified cashew nut shells which provides for oxyalkylating a drastically oxidized or pyrolyzed liquid lignin product known to be phenolic. The reference states it is well-known that the oxyalkylation of phenols yields products with enhanced hydrophilic properties.

U.S. Pat. Nos. 4,486,346 and 4,454,066 disclose the propoxylation of lignin with propylene oxide. The general reaction of ethylene oxide or propylene oxide with alkylphenols is disclosed in U.S. Pat. Nos. 4,104,023 and 4,138,347, U. K. Patent 2,118,937A, and W. G. Glasser, "Engineering Plastics from Lignin. II. Characterization of Hydroxyalkyl Lignin Derivatives," Journal of Applied Polymer Science, Vol. 29, p. 1815-1830 (1984). The alkoxylation of coal with α-olefin epoxide is disclosed in Iso, M., Lee, Y., Sato, K., Shirahase, T., and Omi, S., "Alkoxylation of Coal with α-olefin Epoxide," Fuel, Vol. 67, p. 19-23 (1988).

SUMMARY OF THE INVENTION

A method of producing oil soluble surfactants from lignin is disclosed, along with a method for recovering oil from underground formations by means of a surfactant flooding system containing these lignin surfactants. Lignin is placed in contact with water, and converted into relatively low molecular weight lignin phenols by reducing the lignin in the presence of a carbon monoxide or hydrogen reducing agent at high temperature and pressure. The lignin phenols that are produced from the reduction reaction are recovered with a suitable organic solvent such as benzene, toluene, tetrahydrofuran, ether or diethyl ether. The lignin phenols are then alkoxylated by reaction with an α-olefin epoxide at an elevated temperature in an organic solvent. Finally, the alkoxylated lignin phenols are changed into oil soluble lignin surfactants by a reaction selected from the group consisting of sulfonation, sulfation and alkoxysulfation.

This method of producing oil soluble lignin surfactants provides low cost surfactants which can be used to substantially lower the cost of surfactant flooding systems for recovering oil from underground hydrocarbon formations. Effective surfactant flooding systems can be formulated which contain certain of these lignin surfactants as sole surfactants, as co-surfactants, as solubilizers, or as surfactants and solubilizers. Substantial benefits are obtained from the low cost of these surfactants and the ready availability of lignin and lignosulfonates, the precursor compounds.

DETAILED DESCRIPTION

Both lignin and lignosulfonates may be used in the instant process to prepare the lignin surfactants. The process differences involve no more than a possible change of catalyst and minor modifications in process conditions. Regardless of the starting material, the reduction by carbon monoxide or hydrogen degrades the lignin polymer structure to its simpler repeating units, and in the case of lignosulfonate, severs the sulfonate radical.

The degradation by reduction produces a complex mixture of low molecular weight lignin phenols when done under elevated heat and pressure. These lignin phenols are generally derived from or based on a propane phenol structure which has high solubility in organic solvents. The basic reaction is illustrated below.

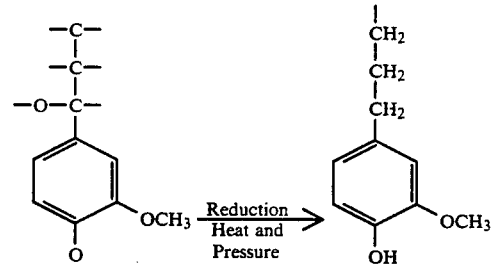

Analysis of the lignin phenol product of the instant process indicates an average molecular weight of about 300 and a range of about 150 to about 1000, compared to a propane phenol molecular weight of 136 and a lignin molecular weight of 3000 to 15,000. It is believed that the lignin phenol product is composed of two, three, four, or more propane phenols linked or fused together plus assorted methoxyls, hydroxyls and other oxygens. Whenever the phrase "lignin phenol" is used herein, it refers to the above product mixture and not propane phenol.

The lignin phenol itself is not very useful as an enhanced oil recovery surfactant. It must be changed into an oil soluble or water soluble surfactant. U.S. Pat. No. 4,739,040 discloses a method for changing the lignin phenol into a water soluble surfactant. The present disclosure describes a method for transforming the lignin phenol into an oil soluble surfactant by alkoxylating at a phenolic site. The alkoxylated lignin phenol then undergoes a reaction of sulfonation, sulfation or alkoxysulfation to produce an oil soluble surfactant.

The reduction reaction is carried out by placing the lignin in contact with water. A high pressure vessel must be used so as to carry out the reduction at a temperature greater than about 200° C., preferably about 300° C. to about 550° C. and a pressure greater than about 100 psi, preferably greater than 500 psi, and perhaps greater than 1000 psi. The lignin may be dissolved or slurried in aqueous medium in concentrations preferably ranging from about 5% to about 20% by weight. Sodium hydroxide or a similar compound may be placed in the aqueous medium in a concentration of about 1% to about 15% by weight, preferably about 5% to about 10% by weight, based upon the weight of the lignin. The addition of sodium hydroxide will increase the amount of lignin which can be solubilized by an aqueous medium.

A pasting oil can be used as the solvent for the lignin reduction reaction. This embodiment does away with the need for a later separation step from water in some cases before proceeding with the final reactions. But it is still necessary to contact the lignin with a relatively small amount of water for an effective reduction to take place.

It is preferred that the reducing agent be injected into the reaction vessel so as to blanket the reduction reaction mixture at an initial pressure greater than about 100 psi, preferably greater than about 500 psi, and most preferably, greater than about 900 psi. This is true where the reducing agent is hydrogen, carbon monoxide, a mixture of hydrogen and carbon monoxide, or synthesis gas. Synthesis gas is any of a wide range of gaseous mixtures resulting from the reaction of carbon-rich substances with steam or steam and oxygen. These gaseous mixtures contain chiefly carbon monoxide and hydrogen, plus relatively low percentages of carbon dioxide and nitrogen.

The reduction reaction will produce much higher yields of lignin phenols if a catalyst is employed with the reducing agent. A ferrous salt, which will provide a ferrous ion ($Fe^{+2}$) to the reaction mixture, is the preferred catalyst for hydrogenation of lignosulfonate. It should be added in about a 1% to about 15% concentration by weight based on the starting lignosulfonate. Other metal ions which may be used to catalyze the hydrogenation of lignosulfonate are: cobalt, molybdenum, nickel and aluminum. When it is desired to reduce kraft lignin, alkali lignin, or desulfonated lignosulfonate by hydrogenation, it is preferred to use about 1% to about 15% by weight of a Raney Nickel catalyst, based on the weight of the kraft lignin. Other catalysts such as palladium may be employed, but Raney Nickel is the most preferred catalyst. However, a Raney Nickel catalyst has little effect upon catalyzing the hydrogenation of lignosulfonate.

For the reduction of lignin and lignosulfonate by carbon monoxide, the reduction reaction may be catalyzed by a sulfur containing compound. The most preferred catalyst is a sulfide, such as hydrogen sulfide, which is added as a gas to the carbon monoxide blanket above the reduction reaction mixture at a partial pressure greater than about 50 psi, preferably greater than about 150 psi. An inorganic sulfide catalyst, such as sodium sulfide, may also be added to the reaction mixture in about a 1% to about 20% by weight concentration. A mixture of carbon monoxide and hydrogen may also be employed as a reducing agent. In this case, a catalyst mixture of hydrogen sulfide and an appropriate hydrogen catalyst seems to be the most effective.

Reaction time varies for the different reducing agents and catalysts and the amount of catalyst employed. In general, the hydrogen reduction reaction should be allowed to proceed at reaction temperature and pressure for a time period of about 30 minutes to about 5 hours and the carbon monoxide reduction for a time of about 15 minutes to about 2 hours.

If the reduction reaction is performed with an aqueous solvent, the oil soluble lignin phenols can be extracted from the reduction reaction mixture with an organic solvent. Preferred solvents are ether, diethyl ether, tetrahydrofuran, benzene and toluene.

One method of recovering the lignin phenols from the reaction product mixture is to filter the product mixture so as to separate the catalyst and any water insoluble solids from the water. Both parts, the aqueous solution and the insoluble solids are washed and extracted with the organic solvent. The two organic soluble fractions are then combined to produce a single organic soluble product. Substantially all of the lignin phenols produced by the reduction reaction will be in the organic solvent fraction.

The yield of lignin phenols from the reduction reactions with either hydrogen or carbon monoxide is dependent upon the reaction temperature. The conversion increases steadily as reaction temperature increases from about 200° C. to about 350° C. Reaction pressure and reaction time above a certain minimum do not significantly affect the yield of lignin phenols from lignin as long as the reduction temperature is above about 200° C.

An analysis of the reaction products indicates that the lignin phenols produced from kraft lignins or lignosulfonates are very similar. This is true whether the reduction is carried out by hydrogenation or carbon monoxide. Higher hydrogen sulfide pressures lead to products with a lower oxygen content and a higher equivalent weight. The molecular weight of the lignin phenols produced by carbon monoxide reduction is substantially independent of reaction time or carbon monoxide or hydrogen sulfide pressure. An average molecular weight of about 250 to 300 grams per mole was determined for the lignin phenols of several carbon monoxide reduction runs.

The structure of the organic soluble products from the hydrogenations and the carbon monoxide reductions, whether or not catalyzed by hydrogen sulfide or other substances, has been verified to be a complex mixture of phenolic products derived from lignin. It is believed to consist of two, three, or four or more, linked or fused, propane phenol units with assorted methoxyl and hydroxyl groups. Extensive loss of sulfur has occurred. Loss of phenolic and ether oxygen, and substantial loss of methoxyl has also occurred.

The degree of agitation during the carbon monoxide reduction reaction also influences the product yield. Several carbon monoxide reduction runs were carried out comparing the percent yield achieved with a stirred pressure reactor vessel and a rocking autoclave. Product conversions went from fifty percent to a mid to high sixties percent conversion rate when a stirred reactor was used. Elemental analysis and NMR analysis of the products from the stirred and rocker reactor vessel runs indicates that the degree of agitation influences the amount of demethoxylation.

In order to transform the lignin phenols into oil soluble surfactants, they must be made more oil soluble and hydrophobic. Attaching a long hydrocarbon chain to the lignin phenol by alkoxylation increases the oil solubility of the lignin phenol. The instant invention does this by reacting an α-olefin epoxide with the lignin phenol at an elevated temperature in an organic solvent. Preferably, the α-olefin epoxide contains about 6 to about 20 carbon atoms, most preferably, about 10 to about 18 carbon atoms.

The lignin phenols and the α-olefin epoxide are preferably reacted in approximately stoichiometric amounts. The preferred organic solvent is tetrahydrofuran, although other organic solvents such as ether, diethyl ether, benzene, toluene or mixtures thereof may be employed. It is believed the epoxide attacks phenolic oxygen sites, adding a hydrocarbon chain at that position.

The alkoxylation reaction preferably occurs at a temperature of about 100° C. to about 200° C. for more than about 1 hour, most preferably about 125° C. to about 175° C. for about 1 to 3 hours in the presence of a catalytically effective amount of sodium hydride. After the reaction is completed, oxalic acid is preferably added to the reaction mixture to neutralize the sodium hydride catalyst.

After alkoxylation, the lignin phenols must be made at least partially water soluble in order to function as surfactants. This may be done by a reaction selected from the group consisting of sulfonation, sulfation, and alkoxysulfation. All of these reactions convert the alkoxylated lignin phenols to products that are surface active. Other modifications are possible with these alkoxylated lignin phenols to produce surfactant products.

Of the various ways to sulfate alkoxylated lignin phenols, one sulfation reaction is the most preferred. Excellent results have been achieved by sulfating with chlorosulfonic acid ($ClSO_3H$) in an anhydrous reaction media. This reaction preferentially attacks the hydroxyl group on the alkyl chain to yield a sulfate. Interfacial tension values for these sulfates have been measured equal to or better than existing commercial surfactants sold for enhanced oil recovery purposes. Although typical lignosulfonates or modified kraft lignin have interfacial tension values of about 5000 mdynes/cm, sulfated, alkoxylated lignin phenols when mixed a water soluble surfactant have interfacial tension values below 200 mdynes/cm and often below 100 mdynes/cm.

The procedure followed for the sulfation reaction with chlorosulfonic acid was to dissolve about 40 milliequivalents of the alkoxylated lignin phenol in a solvent mixture of about 30 milliliters of anhydrous ether and tetrahydrofuran and then slowly add about 80 milliequivalents of chlorosulfonic acid at 10° C. The reaction mixture was allowed to proceed to completion for about 2 hours. The mixture was then hydrolyzed, neutralized with sodium hydroxide, and the sulfated product extracted into tetrahydrofuran. This product is oil soluble and not water soluble, unlike the highly water soluble, sulfated lignin phenols of U.S. Pat. No. 4,739,404.

The alkoxylated lignin phenol may also be sulfonated to transform the product into an oil soluble surfactant. The preferred sulfonation method is to react the alkoxylated lignin phenol with the sulfur trioxide-dioxane complex (1:1) in a solvent such as 1,1,2-trichloroethane. Nitrobenzene, a standard sulfonation solvent, may be employed instead of 1,1,2-trichloroethane, but is less preferred. The higher boiling point of nitrobenzene and the solubility of the sulfonated products in nitrobenzene create a difficult separation process. Ring sulfonation is believed to be the predominant process for the sulfur trioxide-dioxane reaction complex in the 1,1,2-trichloroethane and in nitrobenzene.

Alkoxylated lignin phenols may also be sulfated by sulfomethylation with formaldehyde and sodium sulfite or sodium bisulfite. The sulfomethylation reaction adds the sulfomethylene group ($-CH_2SO_3Na$) to the alkoxylated lignin phenol. Sulfuric acid and sulfur trioxide may also be used to sulfonate the alkoxylated lignin phenol.

Alkoxysulfation is another method for producing oil soluble surfactants having low interfacial tensions from alkoxylated lignin phenols. The alkoxylated lignin phenols are first alkoxylated, preferably ethoxylated, and then sulfated. The chief location of alkoxylation is believed to be at the hydroxyl group on the alkyl chain with later sulfation at the end of the alkoxy chain. The alkoxysulfate chain will preferably have about 0.5 to about 5.0 ethylene oxide groups. The preferred sulfation reaction employs chlorosulfonic acid.

SURFACTANT FLOODING SYSTEMS

The invention also includes the injection of a surfactant flooding system into a reservoir to recover underground hydrocarbons, where the surfactant flooding system contains lignin surfactants produced by the above described process. Depending upon the surfactant formulation, some of these lignin surfactants may be employed as sole surfactants, cosurfactants, or solubilizers in a surfactant flooding system. They may also be used to substitute for a certain percentage of an existing surfactant in a surfactant flooding system to lower the overall cost of the surfactants employed in the flooding system. Many of the lignin surfactants produced according to the above described process provide extremely low interfacial tension between oil and water, and also form stable surfactant systems with many of the commercially available enhanced oil recovery surfactants now on the market.

It is well known that conventional surfactant flooding mixtures are usually composed of one or more petroleum, petrochemical or synthetic sulfonates, a solubilizer or cosurfactant, brine and, optionally, a quantity of hydrocarbon. These components are normally combined to make a surfactant system.

The surfactant system is conventionally injected into a reservoir to form a front followed by the injection of additional brine or water which may contain a mobility control agent. The surfactant system is usually injected as a slug having about 10% to 50% of the pore volume of the reservoir with a total surfactant and solubilizer concentration of about 0.1% to about 10% by weight. A typical surfactant system may be:

1. one or more petroleum sulfonates such as
  (a) a water soluble sulfonate having a relatively low equivalent weight, and
  (b) an oil soluble sulfonate having a relatively high equivalent weight, or
  (c) any other commercially available petroleum sulfonates;
2. a solubilizer or cosurfactant;
3. brine; and
4. optionally, a light hydrocarbon.

As mentioned before, surfactant flooding systems can be formulated under some conditions without a solubilizer and with only a sole surfactant. Petrochemical and synthetic sulfonates may be substituted for petroleum sulfonates. The surfactant slug may also contain or be preceded by a sacrificial agent. Various emulsions or microemulsions employing surfactants may also take the place of a true surfactant solution. The present invention resides in the use of about 0.1% to about 10% concentration by weight of lignin surfactants in any surfactant flooding system to recover underground hydrocarbons, wherein the lignin surfactants are prepared according to the described process.

Surfactant systems are generally pushed through the formation towards a production well by the subsequent injection of a drive fluid. The drive fluid is usually water, gas, or water viscosified by a polymer. Hydrocarbons and other polymers are then recovered at one or more production wells.

The following examples will further illustrate the method of the present invention wherein surfactants are prepared from lignin or the method of injecting a surfactant flooding system containing such lignin surfactants. These examples are given by way of illustration and not as limitations on the scope of the invention. Thus, it should be understood that reaction steps and amounts may be varied with the process still remaining within the scope of the invention.

EXAMPLES

The reduction reaction runs were performed in high pressure, high temperature reactors. The lignin phenol of Examples 1 and 2 was prepared from Indulin AT, a trademarked pine kraft lignin product sold by Westvaco Corp. It is a spray dried powder comprising approximately 95% lignin and the remainder inorganic salts and hemicellulose.

The lignin material was slurried or dissolved in water and added to a Hastelloy C stirred reactor. Carbon monoxide was used to pressure up the reactor to 1000 psig initial pressure. The reaction was run at 350° C. for 120 minutes. The yield of lignin phenol was 68% with a 96% conversion based on the amount of pure lignin converted to product. The lignin phenols of Examples 3-6 were prepared in a similar fashion. Example 3-5 were prepared from Indulin AT by reaction at 430°-450° C.; while Example 6 was prepared from a trademarked sodium lignosulfonate, Lignosite 458, sold by Georgia Pacific Corp., at a temperature of 350° C.

Commercial surfactants and solubilizers used in the Examples were TRS-18, TRS-40, LN-60COS and Alipal CO-436. TRS-18 is a trademarked oil soluble surfactant having an equivalent weight of about 520 sold by Witco Chemical Co. TRS-40 is a trademarked water soluble surfactant having an equivalent weight of about 350 formerly sold by Witco Chemical Co. LN-60COS is a sulfated derivative of ethoxylated alcohol having approximately 12 to 14 carbon atoms with about 6 units of ethylene oxide and an equivalent weight of about 550 prepared by Texaco Chemical Co. Alipal CO-436 is a trademarked sulfated derivative of an alkylphenol with an alkyl group believed to have about 9 carbon atoms and about 3.5 moles ethylene oxide sold by Stepan Chemical Co.

EXAMPLES 1-6

Alkoxylation of Lignin Phenols

A variety of lignin phenols were chosen to determine the effect of their molecular weight on the alkoxylated products. α-olefin epoxides containing 8, 12 and 18 carbons were reacted to give products with different amounts of hydrophobic character in Examples 1-6, as noted in Table 1. The reaction employed equivalent amounts of lignin phenol and α-olefin epoxide. Sodium hydride was used as a catalyst.

In Example 1, 31.3 grams of lignin phenol having 88.92 meq of titratable phenol and 18.16 meq of titratable COOH were dissolved in 98 grams of anhydrous tetrahydrofuran. 1.09 grams of sodium hydride (36.32 meq) was added followed by 16.4 grams (88.92 meq) of 1,2-epoxydodecane. The reaction mixture was sealed in a 300 ml Parr reactor and heated to 150° C. for 2 hours. The bomb was cooled, opened, and 1.63 grams of oxalic acid (18.16 meq) was added to neutralize the catalyst. The mixture was filtered and vacuum stripped to yield 47.9 grams of alkoxylated lignin phenol product.

TABLE 1

ALKOXYLATED LIGNIN PHENOLS

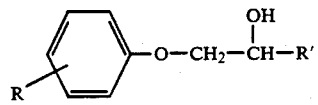

| Example No. | Lignin Phenol VPO. $\overline{M}n$ g/mol | R' | ΦOH meq/g | COOH meq/g | % OH coverage | Calc. $\overline{M}n.^1$ g/mol | VPO. $\overline{M}n^2$ g/mol |
|---|---|---|---|---|---|---|---|
| 1 | 340 | $C_{12}H_{25}$ | 0.820 | 0.990 | 71 | 466 | 508 |
| 2 | 340 | $C_{16}H_{33}$ | 0.858 | 0.945 | 70 | 521 | 521 |
| 3 | 232 | $C_{10}H_{21}$ | 0.611 | 0.417 | 78 | 323 | 350 |
| 4 | 216 | $C_6H_{13}$ | 0.598 | 0.468 | 77 | 272 | 297 |
| 5 | 217 | $C_{16}H_{33}$ | 1.14 | 0.285 | 64 | 335 | 337 |
| 6 | 378 | $C_{16}H_{33}$ | 1.07 | 0.461 | 59 | 532 | 499 |

As noted in Table 1, the product was characterized by weak acid titration of 0.82 meq/grams phenol and 0.99 meq/grams COOH, and a vapor pressure osmometry (hereafter VPO) molecular weight of 508 grams/mole. A molecular weight of 466 grams/mole was calculated based on the weak acid titration data.

The weak acid titration showed considerable reduction in the phenol content as compared to the starting lignin phenol. The COOH contents were unchanged. The percent OH coverage refers to the percentage of phenol that was reacted in the alkoxylation. It was calculated from the phenol meq/g values and was used to calculate an apparent molecular weight for each product. These calculated values agreed reasonably well with the VPO molecular weights and confirmed that an alkoxylation reaction had occurred at the phenolic hydroxyls.

The lignin phenols of Examples 2-6 were prepared in the same fashion as Example 1 to yield alkoxylated lignin phenols having different molecular weights. The alkoxylated lignin phenols were then converted to corresponding sulfates, sulfonates and ethoxysulfates using the procedures set forth herein.

EXAMPLES 7-9

The preparation of the alkoxylated lignin phenol epoxy sulfates was accomplished by ethoxylating the alkoxylated lignin phenols of Examples 3-5 with an ethoxylation target level of 4 ethylene oxide groups per molecule. As indicated in Table 2, analytical work revealed that only about 1 to 2 ethylene oxide groups per molecule were incorporated into each alkoxylated lignin phenol. The additional ethylene oxide was present as polyethylene glycol (PEG). HPLC analysis and VPO molecular weight determinations were used to determine the actual levels of ethylene oxide incorporation in each product.

TABLE 2
ETHOXYLATED ALKOXY LIGNIN PHENOLS

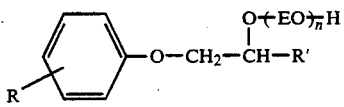

| Example No. | Lignin Phenol Example No. | VPO Mol. Wt. | R' | EO level,[1] n | PEG Analysis, % | VPO Mol. Wt. | Calc[2] Mol. Wt. |
|---|---|---|---|---|---|---|---|
| 7 | 3 | 232 | $C_{10}H_{21}$ | 1.3 | 11 | 389 | 407 |
| 8 | 4 | 216 | $C_6H_{13}$ | 2.2 | 8 | 387 | 394 |
| 9 | 5 | 217 | $C_{16}H_{33}$ | 0.6 | 13 | 329 | 363 |

[1]Calculated from the reaction stoichiometry and the % PEG analysis.
[2]Calculated from the EO level and the molecular weight of the alkoxylated lignin phenol The agreement between the VPO molecular weight and the calculated molecular weight values in Table 2 was good. These products were converted to the ethoxysulfates by the standard procedure outlined above of reaction with chlorosulfonic acid.

COREFLOODS

The oil soluble lignin surfactants were evaluated for their enhanced oil recovery potential and corefloods. The general procedure was to cut Berea sandstone into 2 inch × 2 inch × 12 inch cores and cast the cores in an epoxy mold. Each core was evacuated by vacuum pump and saturated with a simulated field injection bring having 68,000 ppm TDS and a divalent ion content of 3700 ppm. The cores typically had a 150 ml pore volume, a porosity of 0.21-0.22 and a permeability of 250-500 millidarcies.

Each core was then saturated, at a frontal advance rate of 10 feet per day, with an Illinois crude oil having a density of 0.84 grams per milliliter and a viscosity of 6.8 centipoise. Oil saturation continued until water production ceased. Each core was then waterflooded with the field brine at a rate of 5 feet per day until waterflood residual oil saturation was reached.

A ternary blend surfactant slug was comprised of a 0.2 pore volume slug of 3% active lignin surfactant/surfactant/solubilizer in a synthetic field brine of 68,000 ppm TDS. It was followed by a continuous polymer drive of 1500 ppm polyacrylamide in fresh water having a 150 centipoise viscosity (3.7/sec. Brookfield UL). Injection rate for the chemical flood was 1 foot per day. Polymer injection continued until oil production stopped.

EXAMPLE 10

A ternary blend of 60% of sulfated Example 2 alkoxylated lignin phenol/10% TRS-40/30% LN-60COS was made in a synthetic field brine of 68,000 ppm TDS. Measurement of interfacial tension in a spinning-drop tensiometer gave a value of 30 mdynes/cm against the Illinois crude oil used in coreflooding. A coreflood with this ternary blend resulted in a recovery efficiency of 41%.

EXAMPLE 11

A ternary blend of 50% of sulfated Example 2 alkoxylated lignin phenol/25% TRS-40/25% LN-60COS was made in a synthetic field brine of 68,000 ppm TDS. Measurement of interfacial tension in a spinning-drop tensiometer gave a value of 41 mdynes/cm against the Illinois crude oil used in coreflooding. A coreflood with this ternary blend resulted in a recovery efficiency of 40%.

EXAMPLE 12

A ternary blend of 45% of sulfated Example 2 alkoxylated lignin phenol/20% TRS-40/35% Alipal CO-436 was made in a synthetic field brine of 68,000 ppm TDS. Measurement of interfacial tension in a spinning-drop tensiometer gave a value of 22 mdynes/cm against the Illinois crude oil used in coreflooding. A coreflood with this ternary blend resulted in a recovery efficiency of 50%.

EXAMPLE 13

A ternary blend of 30% of sulfated Example 2 alkoxylated lignin phenol/50% TRS-20/20% Alipal CO-436 was made in a synthetic field brine of 68,000 ppm TDS. Measurement of interfacial tension in a spinning-drop tensiometer gave a value of 26 mdynes/cm against the Illinois crude oil used in coreflooding. A coreflood with this ternary blend resulted in a recovery efficiency of 41%.

EXAMPLE 14

A ternary blend of 45% of sulfated Example 3 alkoxylated lignin phenol/35% TRS-40/20% Alipal CO-436 was made. Measurement of interfacial tension in a spinning-drop tensiometer gave a value of 14 mdynes/cm. A coreflood with this ternary blend resulted in a recovery efficiency of 54%.

EXAMPLE 15

A ternary blend of 35% of sulfated Example 3 alkoxylated lignin phenol/50% TRS-40/15% Alipal CO-436 was made. Measurement of interfacial tension in a spinning-drop tensiometer gave a value of 30 mdynes/cm. A coreflood with this ternary blend resulted in a recovery efficiency of 45%.

EXAMPLES 16–18

IFT values were measured as indicated above for ternary blends involving sulfonated versions of the alkoxylated lignin phenols of Example 2. Examples 16–18 were the ternary blends offering the three lowest IFT values. Other excellent IFT values below 100 mdynes/cm were also obtained.

An IFT of 52 mdynes/cm was obtained for the Example 16 ternary blend of 50% sulfonated Example 2/20% TRS-40/30% LN-60COS. An IFT value of 51 mdynes/cm was obtained for the Example 17 ternary blend of 40% sulfonated Example 2/35% TRS-40/25% LN-60COS. In Example 18, an IFT value of 62 mdynes/cm was obtained for the ternary blend of 20% sulfonated Example 2/60% TRS-40/20% LN-60COS.

EXAMPLES 19–21

For Example 19, an IFT value of 7 mdynes/cm was obtained for the ternary blend of 45% sulfonated Example 6/25% TRS-40/30% LN-60COS. A coreflood with this ternary blend gave a recovery efficiency of 42%. For Example 20, an IFT value of 30 mdynes was obtained for the ternary blend of 40% sulfonated Example 6/35% TRS-40/25% LN-60COS. This blend gave a coreflood recovery efficiency of 34%. For Example 21, an IFT value of 43 mdynes/cm was obtained for the ternary blend of 30% sulfonated Example 6/50% TRS-40/20% LN-60COS.

EXAMPLES 22–40

The ethoxysulfated alkoxylated lignin phenols were examined for stability and interfacial tension values in several binary systems in the same simulated field brine having about 68,000 ppm TDS. The alkoxylated lignin phenols of Examples 7–9 were examined in blends with LN-60COS and Alipal CO-436 solubilizers. As indicated in Table 3, the best results were obtained with a relatively high ratio of lignin surfactant to the LN-60COS solubilizer and the Alipal CO-436 solubilizer.

TABLE 3
STABILITY AND IFT VALUES FOR ETHOXYSULFATED ALKOXYLATED LIGNIN PHENOL SYSTEMS IN BRINE

| Ex. | Blend Ratio of Lignin Solubilizer | Sulfated Ex. 8 | | Sulfated Ex. 7 | | Sulfated Ex. 9 | |
|---|---|---|---|---|---|---|---|
| | | LN-60 | CO-436 | LN-60 | CO-436 | LN-60 | CO-436 |
| 22–23 | 60/40 | | | S,390 | S(p) | | |
| 24–27 | 70/30 | S,351 | S,291 | S,369 | S(p)61 | | |
| 28–33 | 80/20 | S,234 | S(p)207 | S(p)177 | U | S,644 | S(p)512 |
| 34–38 | 90/10 | S,194 | S(p)162 | | U | S,558 | S(p)151 |
| 39–40 | 90/5 | | | | | S(p)116 | U |

S = stable; U = unstable;
(p) indicates pearlescent appearance of the solution;
IFT units are mdynes/cm.

Two corefloods were performed using the sulfated ethoxysulated alkoxy lignin phenols of Examples 7 and 9. Those results are indicated in Table 4.

TABLE 4
COREFLOOD RESULTS FOR ETHOXYSULFATED ALKOXYLATED LIGNIN PHENOL SYSTEMS IN BRINE

| Ex | System | $E_R$ (%) |
|---|---|---|
| 41 | 70/30 Sulfated Ex. 7/CO-436 | 28 |
| 42 | 90/10 Sulfated Ex. 9/CO-436 | 31 |

Table 3 clearly shows the Alipal solubilizer has improved interfacial tension properties over the LN-60COS systems for these lignins surfactants. Additional corefloods were done with the LN-60COS solubilizer to match Examples 39–40. But their recoveries were lower than the Alipal CO-436 solubilizer corefloods.

Although these values are good, lower interfacial tension values are generally needed to give commercially sufficient tertiary recoveries. It is believed that modifications may be made to these compounds and systems to improve the overall recovery efficiency of this class of lignin surfactants. Better results may be uncovered with different blending, ternary systems and alternate solubilizers.

Many other variations and modifications may be made in the concepts described by those skilled in the art without departing from the concepts of the present invention. Accordingly, it should be clearly understood that the concepts disclosed in the description are illustrative only and are not intended as limitations on the scope of the invention.

What is claimed is:

1. A method of recovering hydrocarbons from an underground hydrocarbon formation penetrated by at least one injection well and at least one production well, which comprises:

injecting into the formation through an injection well a surfactant slug comprising about 0.1% to about 10% by weight of oil soluble surfactants produced form lignin, said oil soluble surfactants produced by placing lignin in contact with water, converting the lignin into relatively low molecular weight lignin phenols by reducing the lignin in the presence of a reducing agent of carbon monoxide or hydrogen, said reduction occurring at a temperature greater than about 200° C. and a pressure greater than about 100 psi, recovering the oil soluble lignin phenols from the reaction mixture, alkoxylating the lignin phenols by reacting the lignin phenols with an α-olefin epoxide having about 6 to about 20 carbon atoms at about 100° to about 200° C. for about 1 to about 3 hours in an organic solvent, and changing the alkoxylated lignin phenols into oil soluble lignin surfactants by a reaction selected from the group consisting of sulfonation, sulfation, and alkoxysulfation;

injecting into the formation through the injection well a drive fluid to push the surfactant slug towards a production well; and recovering hydrocarbons at the production well.

2. The method of claim 1, further comprising the use of an additional surfactant in the surfactant slug.

3. The method of claim 1, wherein the surfactant slug contains compounds other than surfactant.

* * * * *